(12) United States Patent
Caprara

(10) Patent No.: US 8,964,802 B1
(45) Date of Patent: Feb. 24, 2015

(54) TRAVELING-WAVE RING-OSCILLATORS WITHOUT A FARADAY ROTATOR

(71) Applicant: Coherent, Inc., Santa Clara, CA (US)

(72) Inventor: Andrea Caprara, Palo Alto, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 14/075,953

(22) Filed: Nov. 8, 2013

(51) Int. Cl.
*H01S 3/10* (2006.01)
*H01S 3/109* (2006.01)
*H01S 3/083* (2006.01)

(52) U.S. Cl.
CPC .............. *H01S 3/109* (2013.01); *H01S 3/083* (2013.01)
USPC .................. 372/22; 372/27; 372/94; 372/106

(58) Field of Classification Search
CPC ....................................................... H01S 3/083
USPC ........................................ 372/22, 94, 106, 27
See application file for complete search history.

(56) References Cited

U.S. PATENT DOCUMENTS

| | | | |
|---|---|---|---|
| 4,222,668 A | | 9/1980 | Henry |
| 5,038,352 A | * | 8/1991 | Lenth et al. ...................... 372/21 |
| 5,052,815 A | | 10/1991 | Nightingale et al. |
| 5,119,383 A | | 6/1992 | Duling, III et al. |
| 6,563,845 B2 | | 5/2003 | Kumkar |
| 6,940,880 B2 | | 9/2005 | Butterworth et al. |
| 7,130,321 B2 | * | 10/2006 | Spinelli et al. ................... 372/22 |
| 8,000,372 B1 | * | 8/2011 | Austin et al. ...................... 372/94 |
| 2005/0163187 A1 | | 7/2005 | Spinelli et al. |
| 2005/0265421 A1 | * | 12/2005 | Butterworth et al. .......... 372/107 |
| 2010/0027571 A1 | | 2/2010 | Murdoch |

* cited by examiner

*Primary Examiner* — Tod T Van Roy
*Assistant Examiner* — Vu A Vu
(74) *Attorney, Agent, or Firm* — Morrison & Foerster LLP

(57) ABSTRACT

A ring laser-resonator generating plane-polarized fundamental-frequency radiation includes an optically nonlinear crystal configured for type-II second-harmonic generation of fundamental-frequency radiation. The resonator is configured such that fundamental-frequency radiation circulating either clockwise or counter-clockwise therein makes two passes through the optically nonlinear crystal per round-trip in the resonator in opposite directions, with polarization planes perpendicular to each other. This arrangement forces unidirectional circulation of radiation in the resonator during which second-harmonic radiation is not generated by the crystal.

20 Claims, 3 Drawing Sheets

TRAVELING-WAVE RING-OSCILLATORS WITHOUT A FARADAY ROTATOR

TECHNICAL FIELD OF THE INVENTION

The present invention relates in general to ring lasers. The invention relates in particular to methods for causing unidirectional oscillation in a ring-laser resonator.

DISCUSSION OF BACKGROUND ART

A traveling-wave ring-resonator is often used in a laser which must operate in a single longitudinal mode, with very low noise. A laser incorporating such a resonator is also useful for providing pump-radiation for optical parametric frequency conversion (frequency division).

Typically a traveling wave ring-resonator includes what is usually termed by practitioners of the art as an "optical-diode". Such an optical-diode includes a crystal of a magneto-optic material such as terbium gallium garnet (TGG) or an element of terbium-doped glass. The magneto-optic material is used as a unidirectional polarization rotator, in conjunction with polarization selective elements in the resonator, to provide a loss in one direction of circulation in the resonator that is greater than that in the opposite direction. This forces lasing to occur in the resonator only in the direction of circulation in which the loss is least.

Optical-diodes are most effective in a wavelength range between about 400 nanometers (nm) and 1100 nm. The effectiveness of an optical-diode depends on a so-called "Verdet" constant of the magneto-optic material. This constant defines a degree of polarization-rotation, per unit length of the material, per unit applied magnetic field. The Verdet constant for any given material is wavelength-sensitive, and generally decreases with increasing wavelength. In order to compensate for a lower Verdet constant, the path length in the magneto-optic material must be increased, which increase absorption of radiation in the material. This increases the insertion loss of the optical-diode and reduces the power handling capability of the optical-diode due to heating caused by the absorption.

One method and apparatus for reducing the power load on a TGG crystal used for forcing unidirectional lasing in a ring-laser is described in U.S. Pat. No. 8,000,372, granted to R. Russel Austin and Andrea Caprara, and assigned to the assignee of the present invention and incorporated herein by reference. Here, the laser includes a traveling-wave ring-resonator in which one resonator mirror is a mirror of an interferometer. The interferometer includes a TGG crystal and is arranged such that, when the interferometer is operated in an anti-resonant condition, the mirror has a greater effective reflectivity for clockwise circulation of light in the resonator than for anticlockwise circulation of light in the resonator. There is a difference between the clockwise and anticlockwise effective-reflectivity sufficient that lasing in the resonator is possible only in the clockwise direction. The TGG crystal in the interferometer is subject to only about 10% of the power circulating in the ring-resonator.

However effective the Austin-Caprara interferometer may be, if the circulating power is sufficiently high at a particular wavelength, the TGG crystal may still be overloaded. Further, TGG crystals are expensive and difficult to obtain with consistent quality. There is a need for a method and apparatus for forcing unidirectional lasing in a ring-resonator without the need for a TGG crystal, or any other Faraday rotator.

SUMMARY OF THE INVENTION

The present invention is directed to forcing unidirectional circulation of radiation in a ring laser-resonator. In one aspect of the present invention, a ring laser-resonator is formed by a plurality of mirrors. A gain-element is located in the ring-laser resonator. A pump-radiation source is provided for energizing gain-element, thereby causing fundamental-frequency laser-radiation to circulate in the ring-laser resonator, the radiation being plane-polarized. A first optically nonlinear crystal is located in the resonator and configured for type-II second-harmonic conversion of the fundamental frequency radiation. The laser-resonator is configured such that for fundamental radiation circulating exclusively clockwise or counter-clockwise therein, the fundamental radiation makes first and second passes through the first optically nonlinear crystal per round trip in the resonator, with the first and second passes being in opposite directions, and with the polarization-planes of the first and second passes at 90-degrees to each other.

If the resonator attempted to oscillate both clockwise and counter-clockwise, second-harmonic radiation would be generated by the first optically nonlinear crystal causing a loss for fundamental radiation in addition to a net normal linear loss which is the same for clockwise and counter-clockwise circulation. As a laser resonator always operates in a condition of lowest loss, the resonator operates with exclusively clockwise or counter-clockwise circulation of the fundamental radiation and second harmonic radiation is not generated by the first optically nonlinear crystal during the normal, one-direction of circulation operation. At start up, the inventive laser can be turned rapidly on and off until operation in a required one of the two possible directions of circulation is detected.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
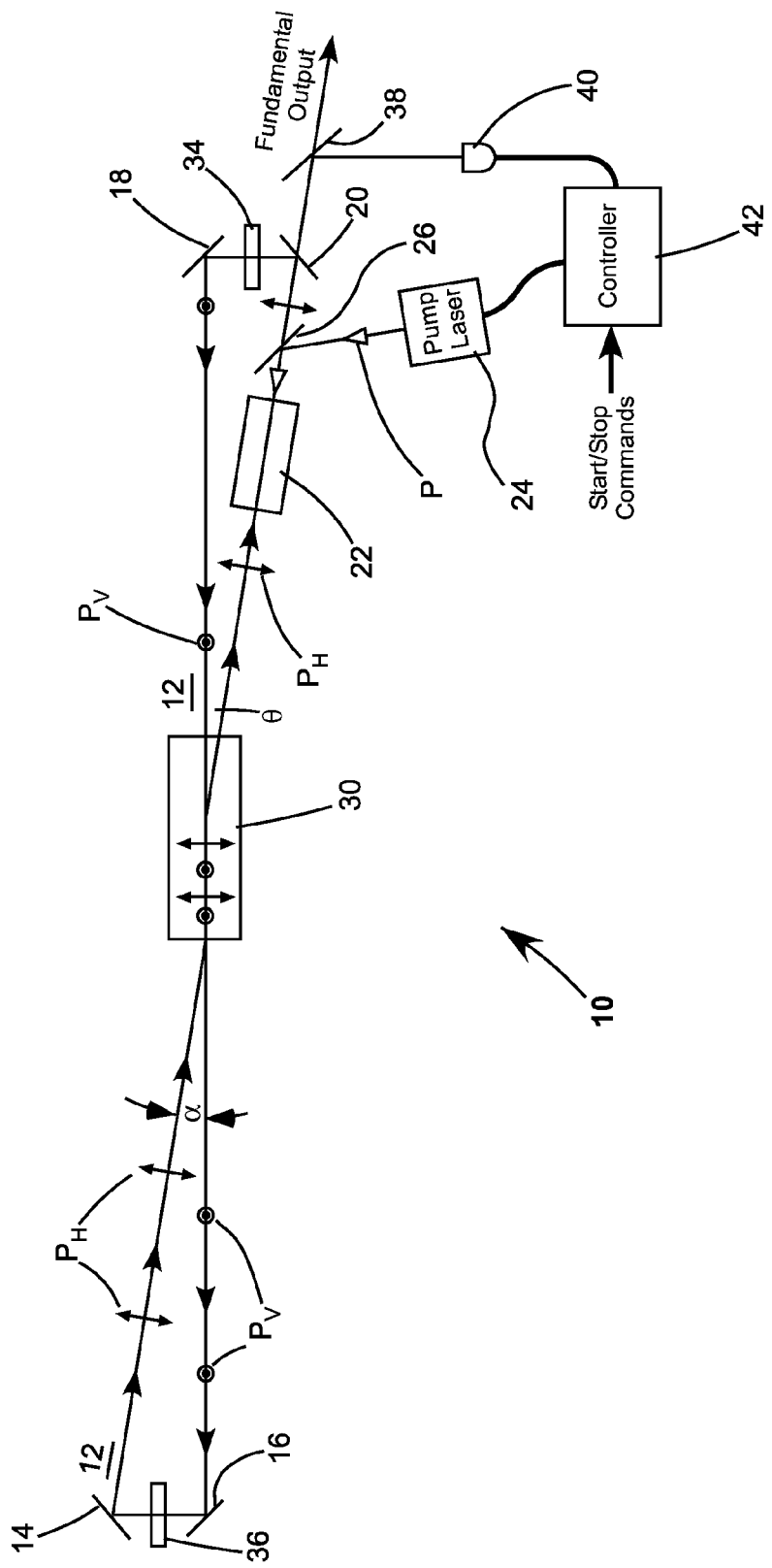
FIG. 1 schematically illustrates one preferred embodiment of a traveling wave ring laser resonator in accordance with the present invention including a first optically nonlinear crystal arranged for type-II second harmonic generation with fundamental radiation circulating in any one sense passing twice through the crystal on every round trip in the resonator with the passes in opposite directions with opposite polarization such that no second-harmonic radiation is generated by the optically nonlinear crystal, the laser output being fundamental radiation FIG. 2 schematically illustrates a BBO crystal suitable for use as the optically nonlinear crystal of FIG. 1.

Referring now to the drawings, wherein like components are designated by like reference numerals, FIG. 1 schematically illustrates one preferred embodiment 10 of a traveling wave laser in accordance with the present invention. Laser 10 includes a ring-resonator 12 formed by mirrors 14, 16, 18, and 20, of which mirrors 14, 16, and 18 are maximally reflective for the fundamental laser wavelength and mirror 20 is partially reflective and partially transmissive for the fundamental laser wavelength.

Resonator 12 includes a gain element 22 which is optically pumped by pump-radiation P from a pump radiation source 24 such as a diode-laser or a diode-laser array. A dichroic mirror 26 reflects pump-radiation to the gain-element. Fundamental radiation (designated by arrows F) circulating in the resonator as a result of the pumping is transmitted by dichroic mirror 26, and is output from resonator 12 via partially transmissive mirror 20.

The resonator configuration provides that the circulating radiation is plane-polarized. For a polarization sensitive gain-element such as neodymium doped yttrium aluminum garnet (Nd:YAG) the gain-element will provide for such operation. Alternatively this can be provided by appropriate selection of resonator components as is known in the art.

Also located in resonator 12 is a birefringent, optically nonlinear crystal 30 which is configured for type-II second harmonic conversion (second-harmonic generation or SHG) of fundamental radiation (for co-propagating beams). Mirrors 14, 16, 18, and 20 form a "bow-tie" ring resonator 12 and crystal 30 is arranged near the center of the resonator such that radiation circulating in any one direction (sense) in resonator 12 makes first and second passes through the crystal in one round-trip in the resonator, with the first and second passes being in opposite directions in the crystal. For purposes of this description, the circulating sense of radiation in FIG. 1, can be described arbitrarily as clockwise.

Half-wave plates 34 and 36 are located in the resonator on opposite sides of crystal 30 in the unidirectional circulating sense such that the polarization-plane of the fundamental radiation is rotated by 90° between successive passes through crystal 30. In FIG. 1, the ordinary ray (beam) of birefringent crystal 30 is designated as vertically polarized (perpendicular to the plane of the drawing) by arrowheads $P_V$. The extraordinary ray (beam) is designated as horizontally polarized by double arrows $P_H$.

The ordinary and extraordinary rays are at an angle α to each other outside the crystal. Angle α is selected dependent on the material and cut of crystal 30 such that the Poynting vectors of the ordinary and extraordinary rays propagate (or counter-propagate) on the same path inside the crystal. The directional (k) vector of the extraordinary ray is at an angle to that path such that the angle between the ordinary and extraordinary rays outside the crystal is the same at each end of the crystal.

In the operating state depicted in FIG. 1, laser 10 is in the desired operating condition with radiation circulating in the resonator in only one directional sense. In this operating state, even though crystal 30 is configured for type-II SHG, no second-harmonic radiation is generated, because the ordinary and extraordinary beams traverse the crystal in opposite directions. This would also be true if radiation were circulating uniquely in the opposite (counter-clockwise) sense. The net loss for uniquely clockwise and uniquely counter-clockwise circulation of fundamental radiation is the same. This is simply the total of linear losses from absorption and scatter in the resonator components (including crystal 30), and the out-coupling loss Now, if the resonator attempted to circulate radiation in both clockwise and counter-clockwise directions, the ordinary beam of one circulating direction would attempt to generate second-harmonic radiation with the extraordinary beam of the opposite circulating direction which would add 2H conversion loss to the linear losses. Accordingly, as the resonator will always oscillate in a condition of least loss, bi-directional circulation is prevented from occurring, and radiation will circulate in one direction only.

A minor problem is that as the net linear loss is the same for each circulating direction, the unidirectional circulation will occur in any one of those directions, at random, when the laser is "turned on", i.e., when optical pumping of gain-element is initiated. Once oscillating in that any one direction, oscillating will continue in that direction, being prevented from changing by the same mechanism that prevents bi-directional oscillation.

In order to force oscillation to take place in a particular direction, a sampling mirror 38 is placed in an output path from mirror 20 corresponding to the required direction of circulation. Were there any output along that path, a sample of that output would be directed to a detector 40 by mirror 38. Detector 40 would provide a signal to a controller 42 if an output-sample were received, i.e., if oscillation were in the preferred direction. Controller 42 functions as follows.

With pump-laser 24 turned-off, controller 42 receives a user command to turn-on laser 10. The controller turns-on pump laser 24 energizing gain-element 22 and initiating oscillation in resonator 12. The controller awaits a signal from detector 40. If after a suitable interval, comparable with turn-on transients duration, typically microseconds to 100 s of microseconds, the signal is not received, oscillation is not in the required direction, the controller turns-off pump laser 40. Then, after a further few microseconds to a few hundreds of microseconds, the controller turns-on pump-laser 24 again. This process is repeated until controller 42 receives a signal from detector 40 indicating that oscillation is in the required direction. The controller then leaves pump-laser 24 turned-on until a command signal is received to turn-off laser 10.

As the probability of oscillation beginning in the required direction is essentially 50%, the above-described start-up procedure of controller 42 will occur typically in less than one second. When laser 10 is operating with the required direction of circulation, detector 10 can be used in a conventional manner, cooperative with controller 42, for monitoring and controlling output power of laser 10. Note that if the oscillation starts up in the unwanted direction, light exiting mirror 20 would not reach mirror 38 and could be captured by a beam dump (not shown).

Figure 2:
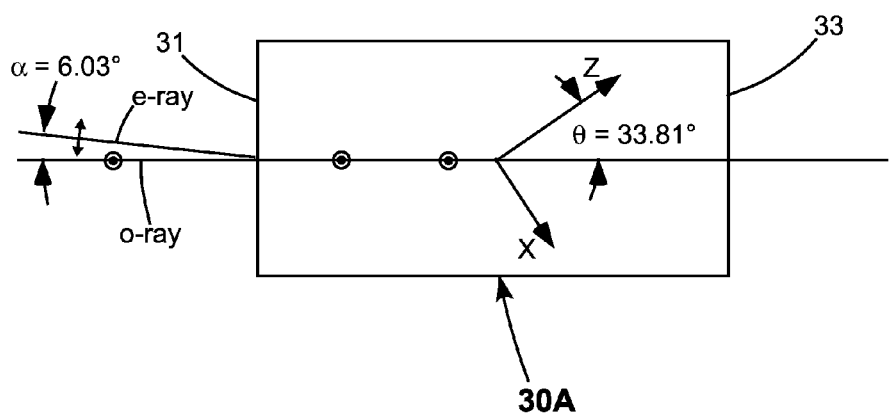

FIG. 2 schematically illustrates a β-barium borate (BBO) crystal 30A suitable for use as the optically nonlinear crystal 30 in laser 10 of FIG. 1. The crystal is cut as a rectangular parallelepiped, with the crystal Z-axis at an angle θ of 33.81° to the longitudinal axis of the crystal. This cut is for 1064 nm fundamental radiation and a crystal temperature of 25° C. The o-ray is normally incident on entrance and exit faces 31 and 33 respectively of crystal 30A. This requires that the angle α between the o-ray and the e-ray be 6.03°. This angle may be enlarged fractionally by a slight inclination of the entrance and exit faces to the longitudinal axis with corresponding adjustment to angle θ. The angle of 6.03°, however, provides sufficient separation of the 0-ray and e-ray paths to allow the simple resonator configuration of FIG. 1.

It should be noted here that for a crystal of lithium borate (LBO) used as crystal 30, angle α would be only about 1°. In this case, increased separation of the o-ray and e-ray paths could be provided by two polarizing beam-splitters one located near each end of the crystal. Such polarization separation may be also used, in any case, to provide a particular ring-resonator configuration, for example, with two or more beam-waists.

Figure 3:
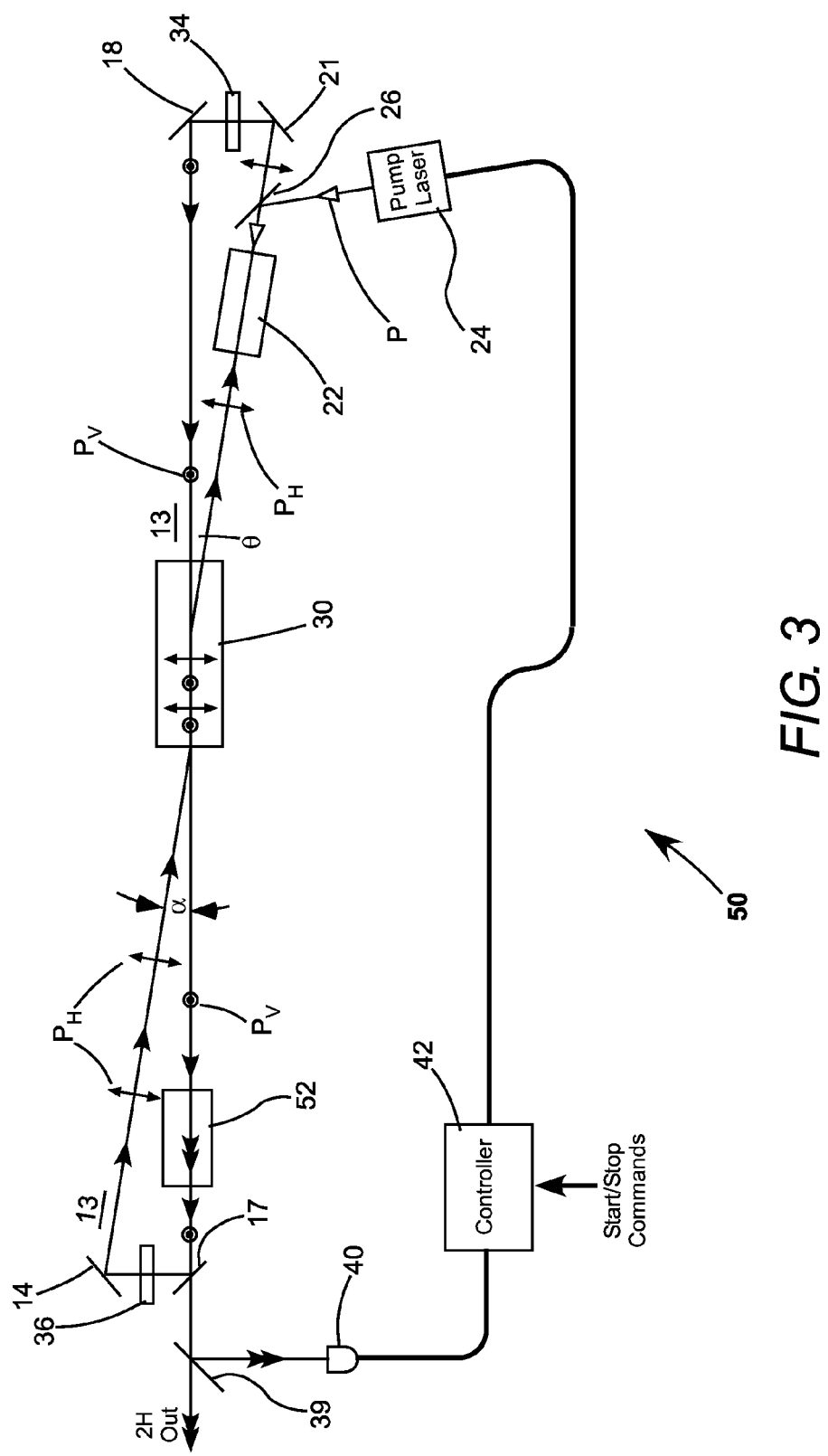
FIG. 3 schematically illustrates another embodiment of a traveling-wave ring-laser resonator in accordance with the present invention similar to the embodiment of FIG. 1, but further including a second optically nonlinear crystal arranged for type-I second-harmonic generation from the circulating fundamental radiation with second-harmonic radiation being output instead of fundamental radiation.

FIG. 3 schematically illustrates another preferred embodiment 50 of a traveling wave ring laser in accordance with the present invention. Laser 50 is similar to laser 10 of FIG. 1, but further includes a second optically nonlinear crystal 52 arranged for type-I second-harmonic generation from the circulating fundamental radiation with second-harmonic (2H) radiation being output instead of fundamental radiation. In order to achieve this, output coupling mirror 20 of laser 10 is replaced in laser 50 by a mirror 21 which is maximally reflective for circulating fundamental radiation F. Mirror 16 of laser 10 is replaced in laser 50 by a dichroic mirror 17 which is maximally reflective for circulating fundamental radiation and maximally transmissive for 2H-radiation. The reconfigured resonator is designated as resonator 13.

In order for crystal 30 to force unidirectional circulation of the fundamental radiation as described above with reference to laser 10, the 2H-conversion efficiency y of optically nonlinear crystal 30 must be greater than the 2H conversion efficiency of optically nonlinear crystal 52. In this arrangement, circulating fundamental radiation passes only once though optically nonlinear crystal 52.

In laser 50, detector 40 here measures a sample of output 2H-radiation provided by a sampling mirror 39. The start-up sequence to establish operation in the required direction is otherwise as described above for laser 10.

It should be noted here that embodiments of the present invention similar to laser 10 can include a nonlinear crystal performing frequency conversion other than second harmonic generation. By way of example, crystal 52 could be replaced in a unidirectional resonator in accordance with the present invention by an optically nonlinear crystal configured for optical parametric generation. Crystal 52 could also be replaced by a crystal configured for sum-frequency mixing of circulating radiation with radiation injected into the crystal from a separate external resonator. In this case the conversion could be type-I or type-II frequency conversion. Whatever, the process of converting fundamental-frequency (fundamental wavelength) radiation to some other frequency (other wavelength) the conversion efficiency of that conversion process from the fundamental wavelength point of view must be less than the 2H-conversion efficiency of crystal 30 which forces unidirectional operation of the inventive laser-resonator.

Those skilled in the art will recognize will recognize that while the present invention is described with reference to the simple bow-tie resonator configuration of FIGS. 1 and 3, other ring-resonator configurations may be used. This might be required, for example, to provide beam-waists at positions in the resonator where optically nonlinear crystals are located. Solid-state gain element 22 may be replaced by an optically-pumped semiconductor gain-structure (gain-element) surmounting a mirror structure that provides one of the resonator mirrors. Whatever resonator construction or gain-element is selected the resonator must be configured such that radiation circulating in either a clockwise or counter-clockwise sense makes first and second passes per round trip in an optically nonlinear crystal configured for type-II SHG, with the first and second passes being in opposite directions, with polarization planes at 90°, i.e., perpendicular, to each other.

In summary, the present invention is described above with reference to a preferred and other embodiments. The invention, however, is not limited to the embodiments described and depicted herein. Rather the invention is limited only by the claims appended hereto.

What is claimed is:

1. Optical apparatus, comprising:
   a ring laser-resonator formed by a plurality of mirrors;
   a gain-element located in the ring-laser resonator;
   a pump-radiation source for energizing the gain-element, thereby causing fundamental-frequency laser-radiation to circulate in the ring-laser resonator, the radiation being plane-polarized;
   a first optically nonlinear crystal located in the resonator and configured for type II second-harmonic conversion of the fundamental frequency; and
   wherein the laser-resonator is configured such that for fundamental radiation circulating exclusively either clockwise or counter-clockwise therein, the fundamental radiation makes first and second passes through the first optically nonlinear crystal per round trip in the resonator, with the first and second passes being in opposite directions, and with the polarization-planes of the first and second passes oriented at 90-degrees to each other.

2. The apparatus of claim 1, wherein the first optically nonlinear crystal is located between first and second half-wave plates for providing the 90-degree orientation of the polarization-planes between the first and second passes of fundamental-frequency radiation through the first optically nonlinear crystal.

3. The apparatus of claim 1, further including a detector cooperative with a controller, the detector arranged to receive output exclusively, from either clockwise or counterclockwise circulating fundamental-frequency radiation in the ring-laser resonator, and provide an output-signal to the controller on receipt of the output.

4. The apparatus of claim 3, wherein on receipt of a command to turn the apparatus on, the controller turns on the pump-radiation source and awaits the output signal from the detector, and if after a predetermined time-interval the output-signal is not received, the controller turns off the pump-radiation source, then repeats the pump-radiation source turning-on and output-signal awaiting until an output-signal is received.

5. The apparatus of claim 1, further including a second optically nonlinear crystal located in the path of circulating fundamental-frequency radiation and configured for conversion of the fundamental-frequency radiation to radiation having a different frequency, the second optically nonlinear crystal having a fundamental-radiation conversion efficiency less than that of the first optically nonlinear crystal and the different-frequency radiation being delivered from the resonator as output-radiation.

6. The apparatus of claim 5, wherein the circulating fundamental radiation passes through the second optically nonlinear crystal only once per round trip in the resonator.

7. The apparatus of claim 5, further including a detector cooperative with a controller, the detector arranged to receive the different-frequency output-radiation generated exclusively from either clockwise or counterclockwise circulating fundamental-frequency radiation in the ring-laser resonator, and to provide an output-signal to the controller on receipt of the different-frequency output-radiation.

8. The apparatus of claim 7, wherein on receipt of a command to turn the apparatus on, the controller turns on the pump-radiation source and awaits the output signal from the detector, and if after a predetermined time-interval the output-signal is not received, the controller turns off the pump-radiation source, then repeats the pump-radiation source turning-on and output-signal awaiting until an output-signal is received.

9. The apparatus of claim 5, wherein the different-frequency radiation is second-harmonic radiation having a frequency twice that of the fundamental frequency.

10. The apparatus of claim 9, wherein the second optically nonlinear crystal is configured for type-I, conversion of the fundamental-frequency radiation.

11. Optical apparatus, comprising:
a ring laser-resonator formed by a plurality of mirrors;
a gain-element located in the ring-laser resonator;
a pump-radiation source for energizing the gain-element, thereby causing fundamental-frequency laser-radiation to circulate in the ring-laser resonator, the radiation being plane-polarized;
a first optically nonlinear crystal located in the resonator and configured for type II second-harmonic conversion of the fundamental frequency wherein the laser-resonator is configured such that for fundamental radiation circulating exclusively either clockwise or counter-clockwise therein, the fundamental radiation makes first and second passes through the first optically nonlinear crystal per round trip in the resonator, with the first and second passes being in opposite directions, and with the polarization-planes of the first and second passes at 90-degrees to each other, whereby during the exclusive clockwise circulation of the fundamental-frequency radiation second-harmonic radiation is not generated by the first optically nonlinear crystal; and
a second optically nonlinear crystal located in the path of circulating fundamental frequency radiation and configured for conversion of the fundamental-frequency radiation to radiation having a different frequency, the second optically nonlinear crystal having a fundamental-radiation conversion efficiency less than that of the first optically nonlinear crystal and the different-frequency radiation being delivered from the resonator as output-radiation.

12. The apparatus of claim 11, wherein the circulating fundamental radiation passes only once per round trip through the second optically nonlinear crystal.

13. The apparatus of claim 12, wherein the different-frequency radiation is second-harmonic radiation having a frequency twice that of the fundamental frequency.

14. The apparatus of claim 13, wherein the second optically nonlinear crystal is configured for type-I, conversion of the fundamental-frequency radiation.

15. A unidirectional ring laser comprising:
a ring resonator formed by a plurality of fold mirrors, said resonator including at least one crossing point;
a gain medium located in the resonator for generating fundamental radiation;
a nonlinear crystal located within the resonator at the crossing point so that fundamental radiation crosses the crystal twice, from opposite directions, once on each round trip within the resonator, said crystal being arranged for Type II frequency conversion; and
a pair of polarizer rotators located in the resonator and arranged so that polarization orientation of the fundamental radiation on the first pass through the crystal is perpendicular to the polarization orientation of the fundamental radiation on the second, opposite direction pass through the crystal, whereby any tendency for the fundamental radiation to circulate around the ring in both directions simultaneously is minimized due to losses that would be generated by the frequency conversion in the nonlinear crystal.

16. The ring laser of claim 15, wherein said polarization rotators are half wave plates.

17. The ring laser of claim 15, further including a detector for monitoring which direction within the ring the fundamental radiation is circulating.

18. The ring laser of claim 17, further including a controller that receives an output from the detector, said controller for restarting the laser if the detector output indicates that the fundamental radiation is circulating in an unwanted direction.

19. The ring laser of claim 15, further including a second nonlinear crystal located in the resonator and arranged for generating frequency converted radiation in a single pass, said frequency converted radiation being coupled out of the resonator.

20. The ring laser of claim 15, wherein the nonlinear crystal is arranged for second harmonic conversion.

\* \* \* \* \*